Jan. 10, 1967     J. S. McLANE     3,296,911

SEVERING APPARATUS

Filed June 4, 1965

INVENTOR.
JACK S. McLANE

United States Patent Office 3,296,911
Patented Jan. 10, 1967

3,296,911
SEVERING APPARATUS
Jack S. McLane, Greensboro, N.C., assignor of one-half to John W. Buchanan, Greensboro, N.C.
Filed June 4, 1965, Ser. No. 461,293
12 Claims. (Cl. 83—408)

This invention relates to apparatus for cutting longitudinally and transversely continuous sheets of relatively thick materials such as paper, plastic, Fiberglas, metal and the like, and relates particularly to machinery especially designed and adapted for cutting thermal and acoustical insulating material for insulating air conditioning and heating duct systems.

The recent advent of lining air conditioning and heating duct segments with insulating material as opposed to wrapping or covering those duct segments with such a material, has created an urgent need for methods and apparatus for cutting insulating material edges straight and accurately. Unless the materials used for lining duct segments are cut with an extremely true edge, the resulting gaps and openings at the junction or abutment of two duct segments will cause the vapor barrier to be broken and condensation to form thus weakening and subsequently destroying the surrounding areas of materials and accumulating moisture at undesired places.

Lining duct segments offers advantages over the conventional wrapping technique in that the work may be done within the sheet metal shop as individual duct segments are formed for the subsequent fabrication of an air conditioning or heating system. The material may be cut and adhered to the preformed metal segment, and after drying has occurred, the segment with its contained liner may then be folded into a closed duct segment to be subsequently joined with other portions.

In modern practice, particularly in sheet metal shops where metal duct work is fabricated for subsequent use in heating and air conditioning systems, lining and insulating these duct sections with preformed patterns of liner material is conventionally accomplished by laboriously measuring each piece of insulation needed to line a defined duct segment and then severing manually this insulation into desired patterns by using a knife and a straight edge. Since the insulating material patterns needed for lining duct segments have heretofore been cut by hand, these areas have not been cut with the greatest of saving due to the labor involved which requires a particular degree of skill as well as extended time. It has been preferred practice to prepare these patterns of fiber duct insulation in the sheet metal shop in order to assure that there is little waste and that the work can be done on a semi-production basis.

A variety of insulating and lining materials are available for use in this highly specialized art including flexible blanket-type glass fiber duct insulation, semi-rigid glass fiber duct liner, mineral fiber duct insulation board and prefabricated round glass fiber duct. It has been found that the invention herein shown and described is particularly well adapted to measure and sever any of these materials without tearing or shearing with extreme accuracy resulting in a large saving in the material. Additionally, the compactness of this apparatus allows its transportation to a job site where it will then occupy only a small space and require only one operator for preparing preselected patterns of material for the subsequent lining and insulating of installed ducting.

In the apparatus herein shown and described, a continuous roll of insulating material is fed from a roll, slit into longitudinal panels and then cut transversely either entirely thereacross including all of the panels or only across selected panels so that any desired length and width of an area of a sheet may be achieved. All of the operations are performed in plain view of the operator, and the machine's construction features are such that one operator by using the invention can accomplish in eight hours what conventionally requires several operators more than forty hours of tedious work. It is to be noted that though the present invention is particularly adapted for severing material patterns for lining ducts, it is equally useful in preparing duct wrapping or binding material for enclosing the duct channels within an insulating cover.

Since all severed edges of material patterns are true and accurate and the surplus material is always in the form of perfect squares or rectangles, the waste in such operations has been reduced from twenty percent to ten percent or less because a "patching" technique may be utilized to apply all surplus pieces.

It is, therefore, an object of my invention to provide a machine for cutting a continuous web of wound insulating material into panels or portions of preselected dimensions in a manner heretofore unknown in the art.

Another object of my invention is to provide a machine for measuring and subsequently severing a continuous web of material that may be operated by a single worker.

A further object of my invention is to provide a machine of the class described for forming material segments of preselected dimensions by the use of a longitudinal cutter held stationary on the frame of the machine as material is moved thereagainst and a transverse cutter which can be selectively activated to cut transversely either entirely thereacross including all of the panels or only selected panels so that any desired length and width of an area of the sheet may be cut.

Yet another object of this invention is to provide a machine of the class described that will effect large savings of material while freeing additional workers for other work.

Yet still another object of this invention is the provision of an apparatus that is portable and space saving so that it may be installed and used at a construction site.

Yet a further object of the present invention is to provide a machine of the class described that may be adapted for use in severing a variety of materials into predimensioned portions or panels.

Still a further object of the present invention is to provide a machine of the class described which will be of simple and cheap construction and will have large capacity whereby patterns may be cut in large quantities at a comparatively small expense.

Still another object of the present invention is to provide a machine of the class described which will eliminate waste material resulting from improper and inaccurate manual cutting.

Other objects and many of the attendant advantages of this novel duct insulation and liner severing machine will become more readily apparent from the following detailed description taken in conjunction with the accompanying drawings in which like characters of reference designate corresponding parts throughout the several views, and wherein.

Figure 1:
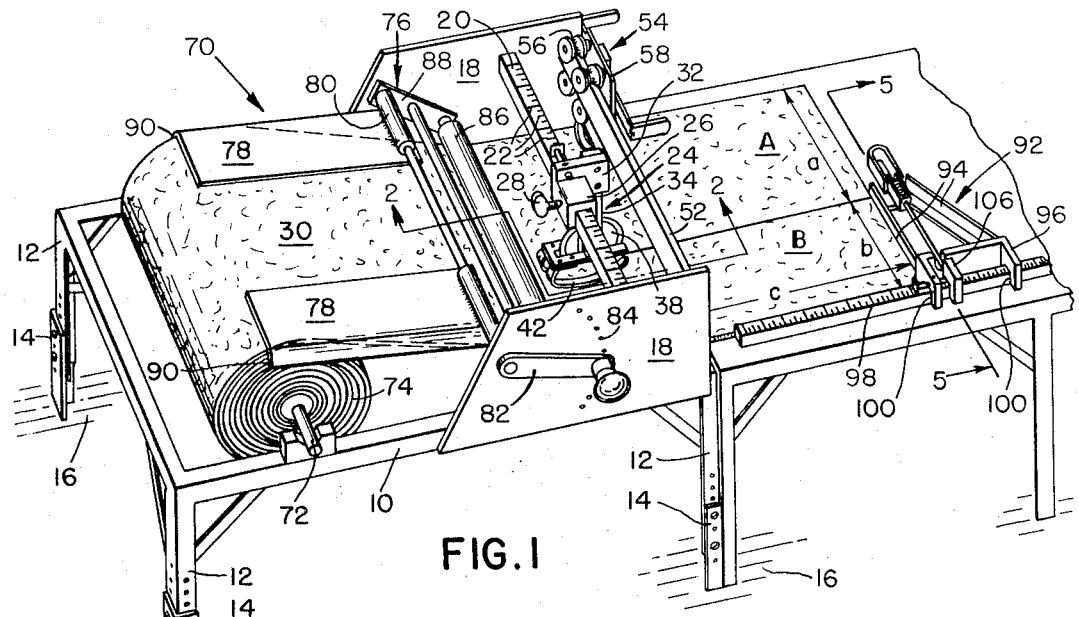
FIG. 1 is a perspective view of a duct insulation and liner severing apparatus embodying the present concept illustrating a continuous web of duct liner material partially unwound and extending through the longitudinal and transverse cutter assemblies of the machine.
Figures 2, 5:
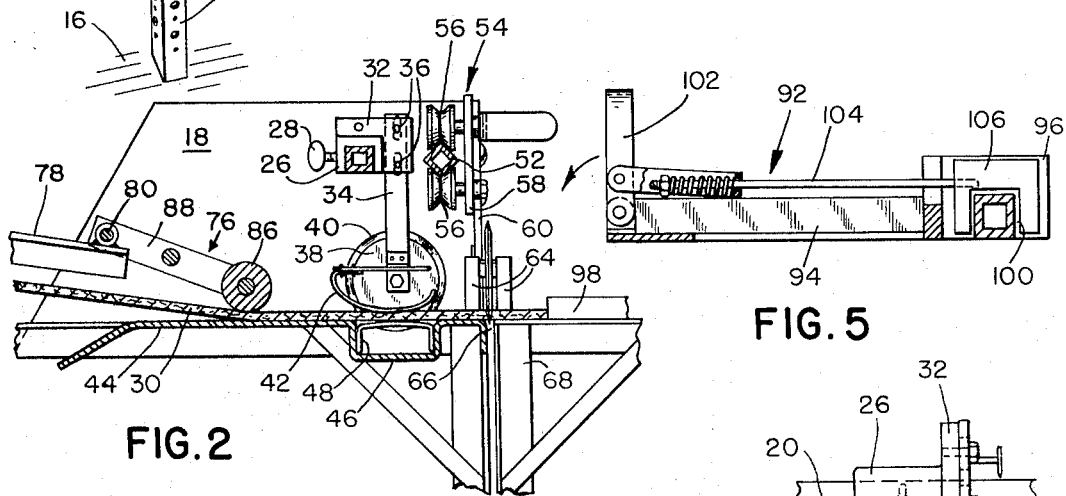
FIG. 2 is an enlarged, fragmentary, sectional side elevational view of the longitudinal and transverse cutting assemblies taken along line 2—2 of FIG. 1.
FIG. 5 is an enlarged, fragmentary side elevational view of the material longitudinal or length measuring assembly taken along line 5—5 of FIG. 1.
Figures 3, 4:
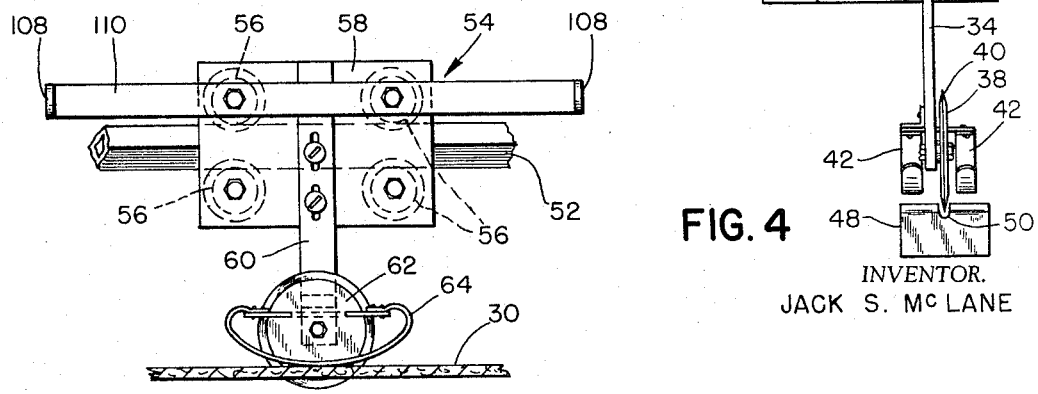
FIG. 3 is an enlarged, side elevational view of the transverse cutter assembly illustrating its movable mounting on a guide rail by means of a plurality of grooved rollers.
FIG. 4 is an enlarged front elevational view of the longitudinal cutter assembly illustrating its positioning within a cooperating mating groove which is slidable with the cutter assembly upon that assembly's selective positioning.

Referring now to the drawings and particularly to FIG. 1, there is illustrated therein one embodiment of the inventive concept of a duct insulation and liner severing apparatus in which a frame 10 of a generally rectangular configuration is supported by a plurality of depending legs 12 to which are attached adjustable extensions 14 for positioning the frame and carrier assembly a suitable and convenient distance from a working surface 16. A pair of upstanding spaced-apart flanges 18 are mounted along opposing sides of frame 10 to carry the cutter assemblies and related equipment subsequently to be described. A cutter support bar 20 extends between flanges 18 and connects these flanges to achieve a positioning substantially parallel to frame 10. Bar 20 is provided with graduations 22 which may be superimposed on the bar or etched therein, these graduations being calibrated in conventionally used inches or centimeters.

A longitudinal cutter assembly generally designated 24 is movably secured or mounted along support bar 20 by a U-shaped collar 26 which may be rigidly held at a preselected position or graduation along bar 20 by means of a thumbscrew 28. Bar 20 with graduations 22 provides visual means for positioning longitudinal cutter assembly 24 to slit selectively advanced material 30 into at least two panels A and B of predetermined widths, *a* and *b*. Cutter assembly 24 is additionally provided with a base member 32 which projects outwardly from bar 20 in a cantilever fashion to offer means for attaching a downwardly extending cutter-carrying arm 34. It has been found suitable and preferable to cast U-shaped member 26 and base member 32 to form an integral unit rather than to fabricate the entire unit from components.

Arm 34 is adjustably secured to base member 32 by means of screws 36. A cutter disc 38 is rotatably mounted at the lower end of arm 34 and engages and severs longitudinally material 30 as it is moved against cutter edge 40. At least two cutter guides 42 are bracketed at the lower end of arm 34 to provide rigidity and tension in material 30 as it is moved against and by cutter 38. Members 42 are in the form of leaf springs which resiliently adjust to a variation in thickness of material 30 passing therebeneath.

Frame 10 has a partial floor 44 which has a U-shaped indent 46 coinciding with the positioning path of cutter assembly 24. An inverted channel section 48 is slidably disposed within indent 46 and has a mating notch or groove 50 to cooperatively receive a portion of cutter disc 38 therein. The meshing of disc 38 within groove 50 insures that material 30 that passes between guides 42 and inverted channel 48 will be completely severed by disc 38 and will not be torn or sheared by partial cutting.

Thus cutter assembly 24 may be moved along graduated bar 20 and secured at a particularly desired width dimension so as to cause cutter 38 to sever material 30 as it is selectively advanced thereagainst. It is contemplated that additional cutter assemblies 24 may be provided to effect the longitudinal severing of a plurality of panel widths should the quantity needed so dictate.

A guide support rail 52 extends between and connects flanges 18 and lies substantially parallel to frame 10 and cutter support bar 20. Rail 52 is additionally positioned to form a diamond-shaped track and may be constructed from block channel turned on edge or back to back angle iron. A transverse cutter assembly generally designated 54 is movably affixed to rail 52 by means of a plurality of rotatable grooved rollers 56 positioned to cooperatively engage rail 52 and allow the entire assembly 54 to move freely thereon. A plate 58 provides a base for mounting grooved rollers 56 and adjustably carrying transverse cutter depending arm 60. A cutter disc 62 is rotatably carried on the lower end of arm 60 similarly to that previously described in the longitudinal cutter assembly. Flexible leaf spring guides 64 are additionally provided on both sides of cutter 62 and secured to the lower end of arm 60 to insure a firm cutting surface for disc 62. A mating groove 66 similar to groove 50 in longitudinal cutter assembly 24 is formed by the separation between frame 10 and an adjoining and isolated cooperating surface structure 68 and allows disc 62 to extend below floor 44 to accomplish complete and accurate cutting without shearing or tearing.

A feed mechanism generally designated 70 controls the delivery or dispensing of material 30 through the previously described cutter assemblies and includes an idler shaft 72 for receiving a continuous roll 74 of material 30, a tensioning mechanism 76 and material guide members 78. Tensioning mechanism 76 is comprised of a pivot shaft 80 actuated by a manual control lever 82 which may be releasably secured in any number of locking perforations 84 recessed in one of flange members 18. As lever 82 is moved, a pressure roller 86 which is rotatably fastened to support brackets 88, is urged against material 30 to yieldably bias that material against movement to prevent an accumulation of material at longitudinal cutter disc 38 because of the free rotation of idler shaft 72. The pressure of roller 86 additionally provides a firm and wrinkle-free material surface for cutting as material 30 is selectively advanced against longitudinal cutter assembly 24. Thus it can be seen that when material is selectively advanced for cutting, the advancing force must overcome the bias of tensioning assembly 76 before the material will be moved against cutting edge 40 of disc 38.

Guide members 78 have flared edges 90 to retain the outer edges of material 30 and maintain this material as it is selectively advanced toward the cutter assemblies in registry and alignment. Members 78 are pivotally secured to flanges 18 so that they might move easily with the material edges as roll 74 is enlarged or diminished.

A longitudinal or length measuring assembly generally designated 92 is positioned atop cooperating working surface 68 to provide accurate measurements of pattern lengths by the machine operator. Assembly 92 is comprised of a stop member 94 which abuts the leading edge of advancing material 30. Stop member 94 is rigidly secured to a U-shaped member 96 which lies along one edge flush with surface 68. A calibrated or graduated guide bar member 98 lies along the surface 68 in a path parallel to the path of movement or travel of selectively advanced material 30. U-shaped member 96 has notched indentures 100 so that stop member 94 and U-shaped member 96 are free to move along the graduated edge of guide bar 98 thus providing an operator with visual means for measuring selectively the desired lengths of *c* of severed panels A and B prior to the cutting of these panels transversely by transverse cutting assembly 54. Measuring assembly 92 is provided with a locking lever 102 which is cooperatively secured to a spring biased rod 104 which in turn is fastened to a notched locking member 106. When lever 102 is pivoted (see arrow) to lie parallel with the surface of structure 68, locking member 106 is urged against guide bar 98 to secure the entire assembly 92 against slidable movement along that bar. Since lever 102 is pivotally secured to stop member 94, the entire assembly is integral and member 106 acts in biased opposition to member 96 to prevent any movement along bar 98. When it is desired to reposition assembly 92 to achieve a different preselected panel length, lever 102 is pivoted upwardly thus allowing the entire assembly to become loose and movable upon member 98 since member 106 no longer acts in opposition to notched indentations 100 of member 96.

In summary, the operation of the duct insulation and liner severing apparatus is essentially that of feeding a continuous web of wound insulating material 30 from a freely rotating idler shaft 72 in registry by means of guide member 78 and under tension by means of tensioning apparatus 76 into engagement with a longitudinal severing assembly 24 which has been positioned to sever the advancing materials into at least two predetermined widths; continuing this longitudinal severing for a predetermined length; and then severing the resulting split panels transversely to form material panels or segments of preselected dimensions. The apparatus may be operated manually by physically pulling material 30 through the longitudinal cutter assembly 24 for a preselected length and then manually cutting those longitudinally slit portions transversely by means of handles 108 carried by bar 110 affixed to plate 58. Additionally, it is contemplated as being within the scope of the present invention to provide automatic means for selectively advancing material 30 through the longitudinal cutting assembly 24 and then automatically transversely severing the slit material by a motorized transverse cutting assembly.

Thus there has been described a novel apparatus for longitudinally and transversely severing a variety of materials to form panels of preselected dimensions. Obviously, many modifications and variations may be made in the construction and arrangements of the longitudinal and transverse cutting assemblies as well as the measuring assembly and guide and tensioning assemblies as well as the other phases of the present inventive concept in the light of the above teachings without departing from the real spirit and purpose of this invention. Such modifications of parts and alternatives as well as the use of mechanical equivalents to those herein illustrated and described are reasonably included and modifications are contemplated.

What is claimed is:

1. An apparatus for cutting a continuous web of selectively advanced material into definite areas comprising in combination: a frame having a plurality of depending adjustable legs; a pair of upstanding spaced-apart flanges mounted on said frame; a graduated cutter support bar interconnecting said flanges and positioned substantially parallel to said frame; a releasably secured longitudinal cutter assembly movably secured to a preselected graduation along said support bar, said assembly having a downwardly extending arm carrying a cutter disc for engaging and severing longitudinally material urged thereagainst subsequent to positioning said assembly at a selected bar graduation; a guide support rail extending between said flanges substantially parallel to said frame and said cutter support bar; a transverse cutter assembly carried by said rail having a roller base plate supporting a pluarlity of rotatable grooved rollers positioned to cooperatively engage said rail and allow said assembly to move thereon; a depending cutter carrying arm mounted to said assembly and a cutter disc revolvably held by said arm for engaging and severing material transversely; a feed mechanism mounted on said frame and adapted to control the delivery of material to said cutter assemblies including an idler shaft for receiving a continuous roll of material, tensioning means including a pivot shaft, support brackets maintaining said shaft therebetween, a positionable control lever operably connected to said shaft, a pressure roller rotatably secured to said support brackets and responsive to movement of said control lever, and locking means to secure and retain said lever in a selected position, said roller biasing said material against movement upon selective displacement of said control lever and guide means having laterally adjustable guide members pivotally connected to said pivot shaft, said guide members having flared downwardly extending edges adapted to engage the edges of the web of advancing material and maintain the web in registry and alignment; and means for measuring said material prior to severing by said longitudinal cutter, said measurement constituting the length of the slit made by said longitudinal cutter when said material is selectively advanced thereagainst whereby a continuous web of wound material is selectively dispensed in registry and under tension from the idler shaft, severed substantially longitudinally for a measured distance and subsequently severed substantially transversely to form material segments of preselected dimensions.

2. An apparatus for severing a continuous web of selectively advanced material into measured areas comprising in combination: a supporting frame; an idler shaft supported by said frame for receiving and maintaining a continuous web of wound material and dispensing said material upon selective advancement thereof; tensioning means yieldably biasing said material against movement; guide means having laterally adjustable guide members pivotally connected to said pivot shaft, said guide members having flared edges adapted to engage the edges of the web of advancing material and maintain the web in registry and alignment; a longitudinal cutter movable on said frame and extending downwardly for engaging and longitudinally slitting said material moving thereunder to form material segments of predetermined widths; means for measuring the length of said longitudinally severed material; and a transverse cutter movable substantially perpendicular to the path of travel of the said material, said transverse cutter engaging and slitting said measured and longitudinally severed material segments into preselected lengths whereby a continuous web of material is dispensed from the idler shaft, moved in registry against the biasing guide and tensioning means, slit substantially parallel to the path of travel for a measured distance into segments of selected widths and subsequently slit substantially perpendicular to the path of travel to form portions of measured areas.

3. An apparatus for severing a continuous web of selectively advanced material into measured areas comprising in combination: a supporting frame; an idler shaft releasably and revolvably supported by said frame for receiving and maintaining a continuous web of wound material, said shaft allowing said material to unroll upon the selective advancement thereof; tensioning means contiguous said wound material yieldably biasing said material against movement; guide means including adjustable guide members operable with said tensioning means, said guide members having flared edges adapted to engage the edges of the web of advancing material and maintain the web in registry and alignment; a longitudinal cutter carried by said frame and movable thereon, said cutter longitudinally slitting said material moving contiguous thereto to form material segments of predetermined widths; means for measuring the length of said longitudinally severed material; and a transverse cutter movable substantially perpendicular to the path of travel of the said material to engage and slit said measured and longitudinally severed material into preselected lengths whereby a continuous web of wound material is unrolled from the idler shaft, moved against the biasing tensioning means, slit substantially parallel to the path of travel for a measured distance into segments of selected widths and subsequently slit substantially perpendicular to the path of travel to form patterns of measured areas.

4. An apparatus for cutting a continuous web of selectively advanced material into definite areas comprising in combination: a support frame having a plurality of depending adjustable legs; an idler shaft releasably and revolvably carried by said frame for receiving a continuous roll of material; tensioning means yieldably biasing said material against movement; adjustable guide means including guide members having flared edges adapted to engage the edges of the web of advancing material and maintain the material web in registry and alignment; a first fixed guide bar carried by said frame above the path of travel of said material, said bar having a graduated portion at least equal to the width of said material therebeneath; a longitudinal cutter carried by said first bar and movable thereon for slitting said selectively advanced material into at least two predetermined widths as said material is move thereagainst; a second fixed guide bar carried by said frame above the path of travel of said material; a transverse cutter carried by said second bar and movable therealong in a path perpendicular to the path of travel of said material to engage and slit said longitudinally slit material to form segments of selected lengths; means for measuring said segment widths prior to slitting by said longitudinal cutter; and means for measuring said segment lengths prior to slitting by said transverse cutter whereby a continuous web of wound material is slectively dispensed from the idler shaft, moved through and against the guide and tensioning means, cut substantially parallel to the path of travel for a measured distance and subsequently cut substantially perpendicular to the path of travel to form predimensioned patterns.

5. An apparatus for cutting a continuous web of selectively advanced material into definite areas comprising in combination: a support frame; an idler shaft supported by said frame for receiving a continuous roll of material; tensioning means yieldably biasing said material against movement; guide means including adjustable guide members having flared edges adapted to engage the edges of the web of advancing material, said guide means cooperating with said tensioning means to maintain the material web in registry and alignment; a first fixed graduated guide bar carried by said frame proximate said material; a longitudinal cutter carried by said first bar for slitting said material longitudinally as said material is moved thereagainst; a second fixed guide bar carried by said frame proximate said material; a transverse cutter movably carried by said second bar to slit said longitudinally slit material transversely; means for positioning said longitudinal cutter at a measured dimension prior to slitting said material by said longitudinal cutter; and means for measuring said material length prior to slitting said material by said transverse cutter whereby a continuous web of wound material is selectively dispensed from the idler shaft, moved through and against the guide and tensioning means, cut substantially parallel to the path of travel for a measured distance and subsequently cut substantially perpendicular to the path of travel to form predimensioned patterns.

6. An apparatus for severing a continuous web of selectively advanced material into definite areas comprising in combination: a supporting frame; an idler shaft supported by said frame for rotatably receiving a continuous web of wound material and dispensing said material upon the selective advancement thereof; guide means including laterally adjustable guide members carried by said frame, said members having flared edges adapted to engage the edges of the web of advancing material and maintain the web in registry and alignment; a fixed guide bar carried by said frame proximate the direction of travel of said material, said bar having measured graduations for a portion at least equal to the width of said material moving proximate thereto; a longitudinal cutter carried by and movable along said graduated bar for engaging and slitting said selectively advanced material to form material segments of predetermined widths; means for measuring the length of said longitudinally severed material; and a transverse cutter movable substantially perpendicular to the path of travel of the said material to slit said premeasured and longitudinally severed material into preselected lengths whereby a wound continuous web of material is selectively dispensed from the idler shaft, moved along the guide means, slit substantially parallel to the path of travel for a measured distance into segments of selected widths and subsequently slit substantially perpendicular to the path of travel to form patterns of measured areas.

7. An apparatus for cutting a continuous web of selectively advanced material into definite areas comprising in combination: a support frame; an idler shaft rotatably carried by said frame for receiving a continuous roll of material; guide means including adjustable guide members having flared web-engaging edges to maintain the material web in registry and alignment; a first fixed graduated guide bar carried by said frame perpendicular to the path of travel of said material; a longitudinal cutter carried by said first bar and movable thereon for slitting said material longitudinally as said material is moved thereagainst; a second fixed guide bar carried by said frame perpendicular to the path of travel of said material; a transverse cutter carried by said second bar and movable therealong to slit said longitudinally slit material into a selected length; and means for positioning said longitudinal and transverse cutter prior to cutting to form an area of preselected dimensions whereby a continuous web of wound material is selectively dispensed from the idler shaft, moved along the guide means, cut substantially longitudinally for a measured distance and subsequently cut substantially transversely to form definite areas.

8. An apparatus for severing a continuous web of selectively advanced material into measured areas comprising in combination: a supporting frame having a plurality of depending adjustable legs adaptable to position said frame a preselected distance from a working surface; an idler shaft releasably and revolvably supported by said frame for receiving and maintaining a continuous web of wound material and dispensing said material upon selective advancement thereof; tensioning means including a pivot shaft, movable support brackets maintaining said shaft therebetween, a positionable control lever operably connected to said shaft, a pressure roller rotatably secured to said support brackets and responsive to movement of said control lever, and locking means to secure and retain said lever in a selected position, said roller biasing said material against movement upon selective displacement of said control lever; adjustable guide means for maintaining said material in registry and alignment; a fixed guide bar carried by said frame above the path of travel of said material, said bar having measured graduations for a portion equal to at least the width of said material web moving therebeneath; a longitudinal cutter carried by said bar and movable therealong, said cutter being securable at a selected graduation and extending downwardly for engaging and longitudinally slitting said material moving thereunder to form at least two separated material segments of predetermined widths; means for measuring the length of said longitudinally severed material; and a transverse cutter movable for cutting substantially perpendicular to the path of travel of the said material, said transverse cutter engaging and slitting said measured and longitudinally severed material segments into preselected lengths whereby a continuous web of material is selectively dispensed from the idler shaft, moved in registry against the biasing guide and tensioning means, slit substantially parallel to the path of travel for a measured distance into segments of selected widths and subsequently slit substantially perpendicular to the path of travel into segments of selected lengths to form patterns of measured areas.

9. An apparatus for cutting a continuous web of selectively advanced material into definite areas comprising in combination: a frame; a pair of upstanding spaced-apart flanges mounted on said frame; a graduated cutter support bar connecting said flanges; longitudinal cutter assembly movable to a preselected graduation along said support bar, said assembly having an arm for rotatably carrying a cutter disc to engage and sever material urged thereagainst; a guide support rail extending between said flanges; a transverse cutter assembly movably carried by said rail; a depending arm mounted to said assembly revolvably carrying a cutter disc for engaging and severing material transversely; a feed mechanism mounted on said frame adapted to control the delivery of material including an idler shaft, and guide means for maintaining said material in registry and alignment, said guide means including laterally adjustable guide members having flared edges adapted to engage the edges of the web of advancing material to maintain said web in registry and alignment; and means for measuring the length of said material prior to severing by said longitudinal cutter, whereby a continuous web of wound material is selectively dispensed under tension from the idler shaft in registry, severed substantially longitudinally for a measured distance and subsequently severed substantially transversely to form material segments of preselected dimensions.

10. An apparatus for cutting a continuous web of selectively advanced material into definite areas comprising in combination: a frame; a pair of upstanding spaced-apart flanges mounted on said frame; a graduated cutter support bar connecting said flanges and positioned substantially parallel to said frame; a releasably secured longitudinal cutter assembly movable to a preselected graduation along said support bar, said assembly having an arm to rotatably carry a cutter disc for engaging and severing material urged thereagainst subsequent to positioning said assembly at a selected bar graduation; a guide support rail extending between said flanges substantially parallel to said frame and said cutter support bar; a transverse cutter assembly having a cutter disc and carried by said rail and movable thereon to sever said material substantially perpendicular to the direction of material travel; a feed mechanism mounted on said frame and adapted to control the delivery of material including an idler shaft for receiving a continuous roll of material, tensioning means yieldably biasing said material against movement and guide means for maintaining said material in registry and alignment, said guide means including rearwardly extending guide members adapted to engage the edges of the web of advancing material; and means for measuring said material prior to severing by said longitudinal cutter, said measurement constituting the length of the slit made by said longitudinal cutter when said material is selectively advanced thereagainst whereby a continuous web of wound material is selectively dispensed under tension from the idler shaft in registry, severed substantially longitudinally for a measured distance and subsequently severed substantially transversely to form material segments of preselected dimensions.

11. An apparatus for cutting a continuous web of selectively advanced material into definite areas comprising a combination: a frame; a pair of upstanding spaced-apart flanges mounted on said frame; a graduated cutter support bar connecting said flanges and positioned substantially parallel to said frame; a releasably secured longitudinal cutter assembly movable to a preselected graduation along said support bar, said assembly having a downwardly extending arm for rotatably carrying a cutter disc for engaging and severing material urged thereagainst subsequent to positioning said assembly at a selected bar graduation; a guide support rail extending between said flanges substantially parallel to said frame and said cutter support bar; a transverse cutter assembly carried by said rail having a roller base plate supporting a plurality of rotatable grooved rollers positioned to cooperatively engage said rail and allow said assembly to move thereon, a depending cutter carrying arm mounted to said assembly and a cutter disc revolvably held by said arm for engaging and severing material transversely; an idler shaft for receiving and selectively dispensing a continuous roll of material for cutting; guide means including flat adjustable guide members having flared downwardly extending edges adapted to engage the edges of the web of advancing material and maintain the web in registry and alignment; and means for measuring said material preparatory to severing by said longitudinal cutter, said measurement constituting the length of the slit made by said longitudinal cutter when said material is selectively advanced thereagainst whereby a continuous web of wound material is selectively dispensed under tension from the idler shaft in registry, severed substantially longitudinally for a measured distance and subsequently severed substantially transversely to form material segments of preselected dimensions.

12. An apparatus for cutting a continuous web of selectively advanced material into definite areas comprising in combination: a frame; a pair of spaced-apart flanges mounted on said frame; a graduated cutter support bar connecting said flanges and positioned substantially parallel to said frame; a longitudinal cutter assembly movable to preselected graduations along said support bar for engaging and severing material urged thereagainst; a guide support rail extending between said flanges; a transverse cutter assembly movably carried by said rail for engaging and severing said material transversely; a feed mechanism mounted on said frame and adapted to control the delivery of material, said feed mechanism including guide means having adjustable rearwardly extending flat guide members, said members having flared downwardly extending means to engage the edges of the web of advancing material and to maintain the material web in registry and alignment; and means for measuring said material prior to severing by said longitudinal cutter, whereby a continuous web of wound material is selectively dispensed under tension from the idler shaft in registry, severed substantially longitudinally for a measured distance and subsequently severed substantially transversely to form material segments of preselected dimensions.

References Cited by the Examiner
UNITED STATES PATENTS

| | | | |
|---|---|---|---|
| 376,025 | 1/1888 | Broussier | 83—408 |
| 493,351 | 3/1893 | Burbank | 83—488 |
| 527,051 | 10/1894 | Cramby | 83—408 |
| 633,321 | 9/1899 | Kitchen | 83—408 |
| 1,077,040 | 10/1913 | Childs | 83—408 |
| 1,529,303 | 3/1925 | Drucker | 143—46 |
| 2,527,739 | 10/1950 | Knabusch et al. | 83—488 |
| 2,610,688 | 9/1952 | Overman | 83—488 |
| 3,203,291 | 8/1965 | Elsas | 83—408 |

WILLIAM S. LAWSON, *Primary Examiner.*

WILLIAM W. DYER, Jr., L. B. TAYLOR,
*Assistant Examiners.*